US012591392B2

(12) United States Patent
Kim

(10) Patent No.: US 12,591,392 B2
(45) Date of Patent: Mar. 31, 2026

(54) STORAGE DEVICE UPDATING ATTRIBUTE OF DATA AND OPERATING METHOD OF THE STORAGE DEVICE

(71) Applicant: SK hynix Inc., Icheon-si (KR)

(72) Inventor: Jin Woo Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 28 days.

(21) Appl. No.: 18/497,603

(22) Filed: Oct. 30, 2023

(65) Prior Publication Data

US 2024/0419357 A1     Dec. 19, 2024

(30) Foreign Application Priority Data

Jun. 14, 2023     (KR) ........................ 10-2023-0075926

(51) Int. Cl.
G06F 3/06          (2006.01)

(52) U.S. Cl.
CPC .......... G06F 3/0659 (2013.01); G06F 3/0604 (2013.01); G06F 3/0619 (2013.01); G06F 3/0673 (2013.01)

(58) Field of Classification Search
CPC .... G06F 3/0659; G06F 3/0604; G06F 3/0619; G06F 3/0673
See application file for complete search history.

(56) References Cited

U.S. PATENT DOCUMENTS

| | | | | |
|---|---|---|---|---|
| 11,249,652 B1 * | 2/2022 | Kuzmin | .................. | G06F 3/061 |
| 2011/0238892 A1 * | 9/2011 | Tsai | ...................... | G11C 16/349 |
| | | | | 711/E12.008 |
| 2019/0377494 A1 * | 12/2019 | Rao | ...................... | G06F 12/0246 |
| 2020/0097399 A1 * | 3/2020 | Lee | ...................... | G06F 12/0253 |
| 2022/0300184 A1 * | 9/2022 | Yang | ...................... | G11C 16/16 |
| 2022/0405000 A1 * | 12/2022 | Hong | ..................... | G06F 3/0652 |
| 2024/0069782 A1 * | 2/2024 | Bae | .......................... | G06F 3/064 |

FOREIGN PATENT DOCUMENTS

KR     10-2022-0169812 A     12/2022

* cited by examiner

*Primary Examiner* — Jared I Rutz
*Assistant Examiner* — Chen Gu

(57)     ABSTRACT
A storage device may write data to a memory as requested by an external device. Subsequently, the storage device may update an attribute of the data based on an increment of an average program-erase cycle of the memory and whether the data has been overwritten. The attribute of the data may be one of a plurality of candidate attributes and the plurality of candidate attributes may include hot, cold, and warm.

16 Claims, 13 Drawing Sheets

① (AVG_EW(T2) − AVG_EW(T1))
② whether TGT_DATA is overwritten

*time = T2*

1

STORAGE DEVICE UPDATING ATTRIBUTE OF DATA AND OPERATING METHOD OF THE STORAGE DEVICE

CROSS-REFERENCES TO RELATED APPLICATION

The present application claims priority under 35 U.S.C. 119(a) to Korean patent application number 10-2023-0075926 filed in the Korean Intellectual Property Office on Jun. 14, 2023, which is incorporated herein by reference in its entirety.

BACKGROUND

1. Technical Field

Various embodiments generally relate to a storage device updating an attribute of data, and an operating method of the storage device.

2. Related Art

A storage device is a device for storing data according to a request from an external device such as a computer, a mobile terminal such as a smart phone or tablet, or the like.

A storage device may further include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

Meanwhile, the storage device may manage an attribute of data stored in the memory. In order to efficiently manage an over-provisioning area, the storage device may use the attribute of the data as hint information about the lifespan of the data.

The storage device may increase data storage efficiency by storing data having the same attribute in the same area. In general, the attribute of the data may be provided by the external device.

SUMMARY

Embodiments of the present disclosure may provide a storage device capable of increasing data storage efficiency and improving operation performance by self-updating an attribute of the data, and an operating method of the storage device.

In one aspect, embodiments of the present disclosure may provide a storage device including a memory, and a controller configured to write data to the memory in response to a request from an external device, and update an attribute of the data based on an increment of an average program-erase cycle of the memory and whether the data has been overwritten.

In another aspect, embodiments of the present disclosure may provide an operating method of a storage device including writing data requested by an external device to the memory, calculating an increment of an average program-erase cycle of the memory, determining whether the data has been overwritten, and updating an attribute of the data based on the increment of the average program-erase cycle and whether the data has been overwritten.

In another aspect, embodiments of the present disclosure may provide a system including a memory including a plurality of memory blocks, and a controller configured to determine an increment of an average program-erase cycle of the plurality of memory blocks from a first time point to a second time point, the first time point corresponding to a time when data requested by an external device is written to a target memory block, among the plurality of memory blocks, and the second time point corresponding to a reference time point, determine whether the data has been overwritten at the reference time point, and update an attribute of the data based on the increment of the average program-erase cycle and whether the data has been overwritten. In this case, the attribute of the data may be hot, cold, or warm and the reference time point is time point when the target memory block may be determined as a victim memory block for garbage collection or when the data is overwritten.

According to embodiments of the present disclosure, it is possible to increase data storage efficiency and improve operation performance by self-updating attribute of the data.

DETAIL DESCRIPTION OF THE EXEMPLARY EMBODIMENTS

Figure 1:
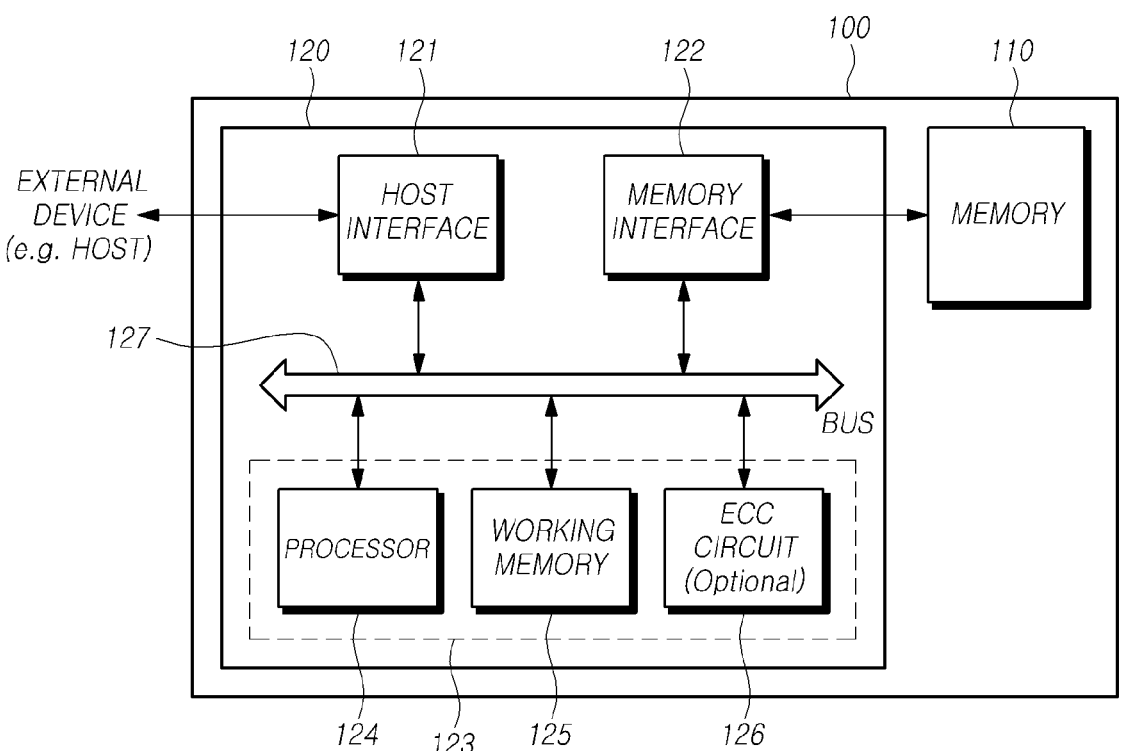
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
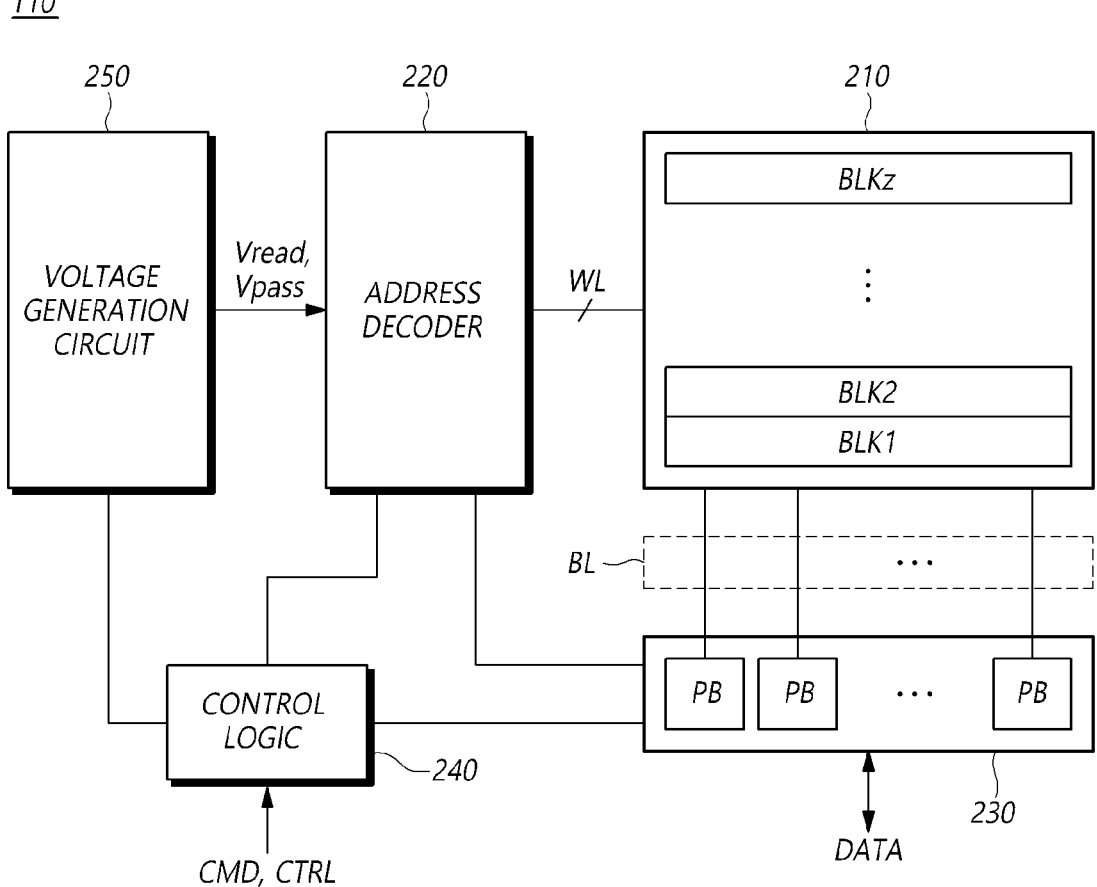
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor.

The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
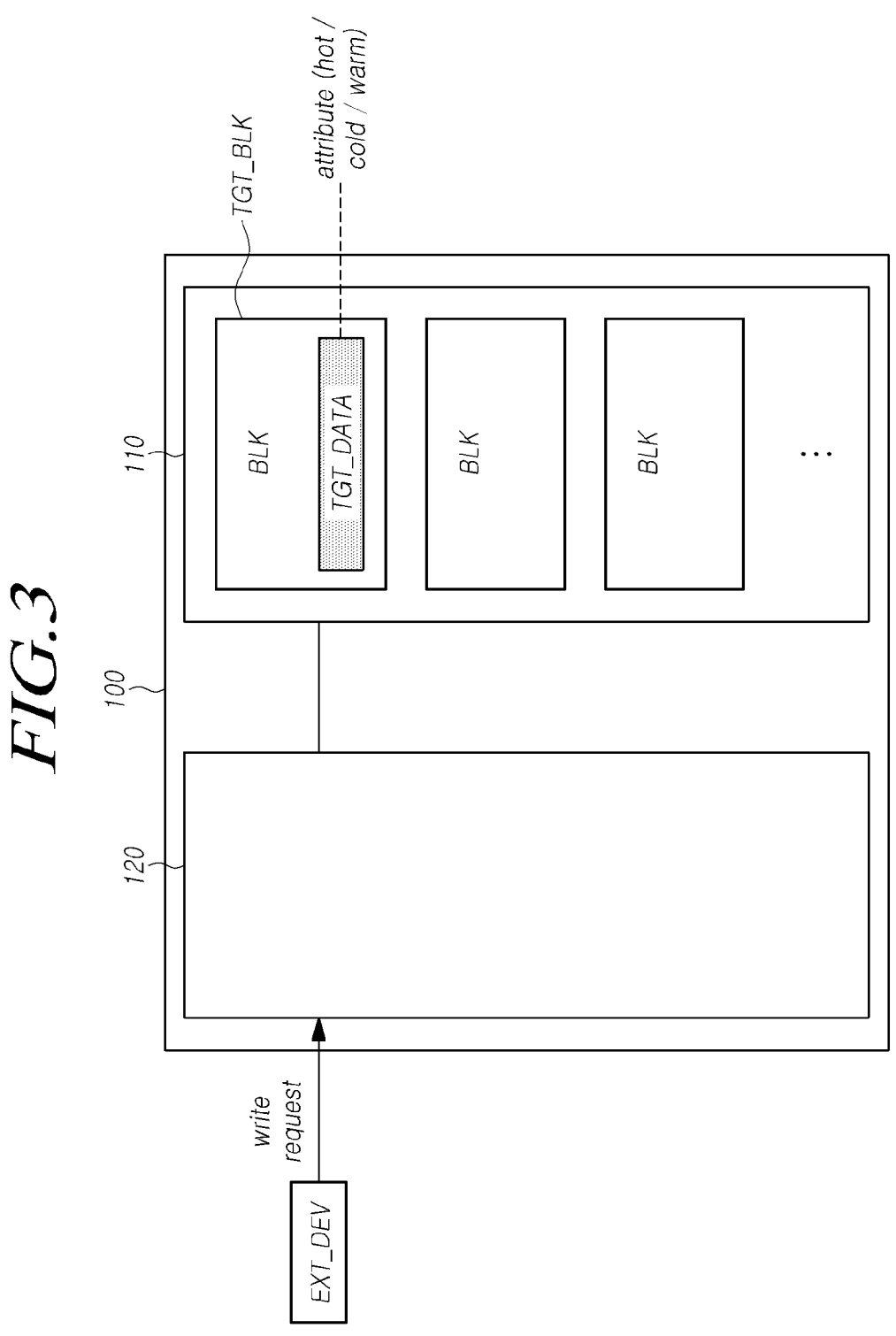
FIG. 3 illustrates a schematic structure of a storage device according to embodiments of the present disclosure.

FIG. 3 illustrates a schematic structure of a storage device 100 according to embodiments of the present disclosure.

Referring to FIG. 3, the storage device 100 may include a memory 110 and a controller 120.

For example, the memory 110 may include a plurality of memory blocks BLK. The plurality of memory blocks BLK may store data.

The controller 120 may write data TGT_DATA to the memory 110 as requested by an external device EXT_DEV. For example, the controller 120 may write the data TGT_DATA to a target memory block TGT_BLK among the plurality of memory blocks BLK included in the memory 110. The external device EXT_DEV may transmit a command requesting to write the data TGT_DATA to the controller 120.

As part of writing the data TGT_DATA, the controller 120 may update an attribute of the data TGT_DATA. The attribute of the data TGT_DATA may be information representing a frequency at which the data TGT_DATA is updated (overwritten). The attribute of the data TGT_DATA may be stored in the memory 110 or inside the controller 120 (e.g., inside the working memory 125).

Data having the same attribute may be stored in the target memory block TGT_BLK. That is, the attribute of other data stored in the target memory block TGT_BLK may be the same as the attribute of the data TGT_DATA. Through this, the controller 120 may increase storage efficiency by storing frequently updated data in the same memory block.

In the embodiments of the present disclosure, the attribute of the data TGT_DATA may be determined in various ways.

For example, the attribute of the data TGT_DATA may be one of a plurality of candidate attributes. The plurality of candidate attributes may include hot, cold, and warm. That is, hot, cold and warm may be one of the plurality of candidate attributes, respectively. In some embodiments, one or more attributes other than hot, cold, and warm may be included in the plurality of candidate attributes.

Hot, cold, and warm may represent respective relative update frequencies of the data TGT_DATA. When the update frequency of the data TGT_DATA is relatively high, the attribute of the data TGT_DATA may be hot; when the update frequency of the data TGT_DATA is relatively medium, the attribute of the data TGT_DATA may be warm; when the update frequency of the data TGT_DATA is relatively low, the attribute of the data TGT_DATA may be cold.

For example, when the attribute of the data TGT_DATA is hot, the controller 120 may determine that an expected update frequency of the data TGT_DATA is high. The controller 120 may determine that when the attribute of the data TGT_DATA is warm, the expected update frequency of the data TGT_DATA is lower than that of the case of hot. When the attribute of the data TGT_DATA is cold, the controller 120 may determine that the expected update frequency of the data TGT_DATA is lower than that of the case of warm.

Figure 4:
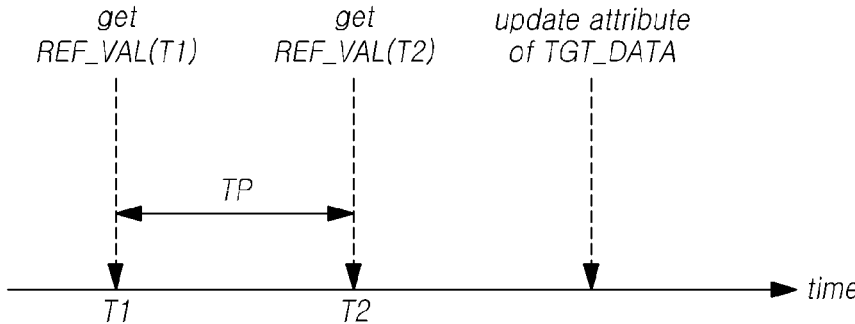
FIG. 4 illustrates an operation in which a storage device updates an attribute of data according to embodiments of the present disclosure.

FIG. 4 illustrates an operation in which a storage device 100 updates attribute of data TGT_DATA according to embodiments of the present disclosure.

Referring to FIG. 4, the controller 120 of the storage device 100 may set a reference value REF_VAL(T1) at a first time point T1 and a reference value REF_VAL(T2) at a second time point T2. A time period TP may be identified based on the first time point T1 and the second time point T2.

The controller 120 may calculate the reference value REF_VAL(T1) at the first time point T1 and the reference value REF_VAL(T2) at the second time point T2. The controller 120 may update the attribute of the data TGT_DATA using the reference value REF_VAL(T1) and the reference value REF_VAL(T2).

The reason why the controller 120 updates the attribute of the data TGT_DATA is that an attribute previously assigned to the data TGT_DATA may differ from the actual attribute of the data TGT_DATA.

In general, the attribute of the data TGT_DATA may be determined by an external device EXT_DEV that is requesting writing of the data TGT_DATA. For example, the file system (e.g., the Flash Friendly File System (F2FS)) used by the operating system of the external device EXT_DEV may determine the attribute (e.g., hot, cold, or warm) of the data TGT_DATA, and transmit the determined attribute of the data TGT_DATA to the storage device 100.

However, the attribute of the data TGT_DATA transmitted by the external device EXT_DEV may not accurately represent the actual update frequency of the data TGT_DATA.

For example, when the data TGT_DATA is meta data, the external device EXT_DEV may indicate that the attribute of the data TGT_DATA is hot, but the data TGT_DATA may not be updated for a long time.

As another example, when the data TGT_DATA is media file data, the external device EXT_DEV may indicate that the attribute of the data TGT_DATA is cold, but the data TGT_DATA may be frequently updated.

In these cases, because the controller 120 cannot recognize the actual update frequency of the data TGT_DATA, determination errors may continue to occur, and as a result, data storage efficiency and operational performance may degrade. For example, when cold data is gathered in one memory block and some of the data is updated, the size of an invalid space in the memory block may increase. As another example, if hot data is gathered in one memory block and the data is not updated for a long time, the number of free memory blocks in the memory 110 may not increase because the memory block is not converted into a reusable memory block without garbage collection.

Accordingly, the controller 120 may increase data storage efficiency of the storage device 100 and improve operational performance of the storage device 100 by updating the attribute of the data TGT_DATA by itself. That is, the controller 120 may determine whether the attribute of the data TGT_DATA matches the actual update frequency, and may change the attribute of the data TGT_DATA if they do not match.

In the above, it has been described that the controller 120 updates the attribute of the data TGT_DATA based on the reference value REF_VAL(T1) at the first time point T1 and the reference value REF_VAL(T2) at the second time point T2.

Hereinafter, an example of the first time point T1, the reference value REF_VAL, and the second time point T2 will be described.

Figure 5:
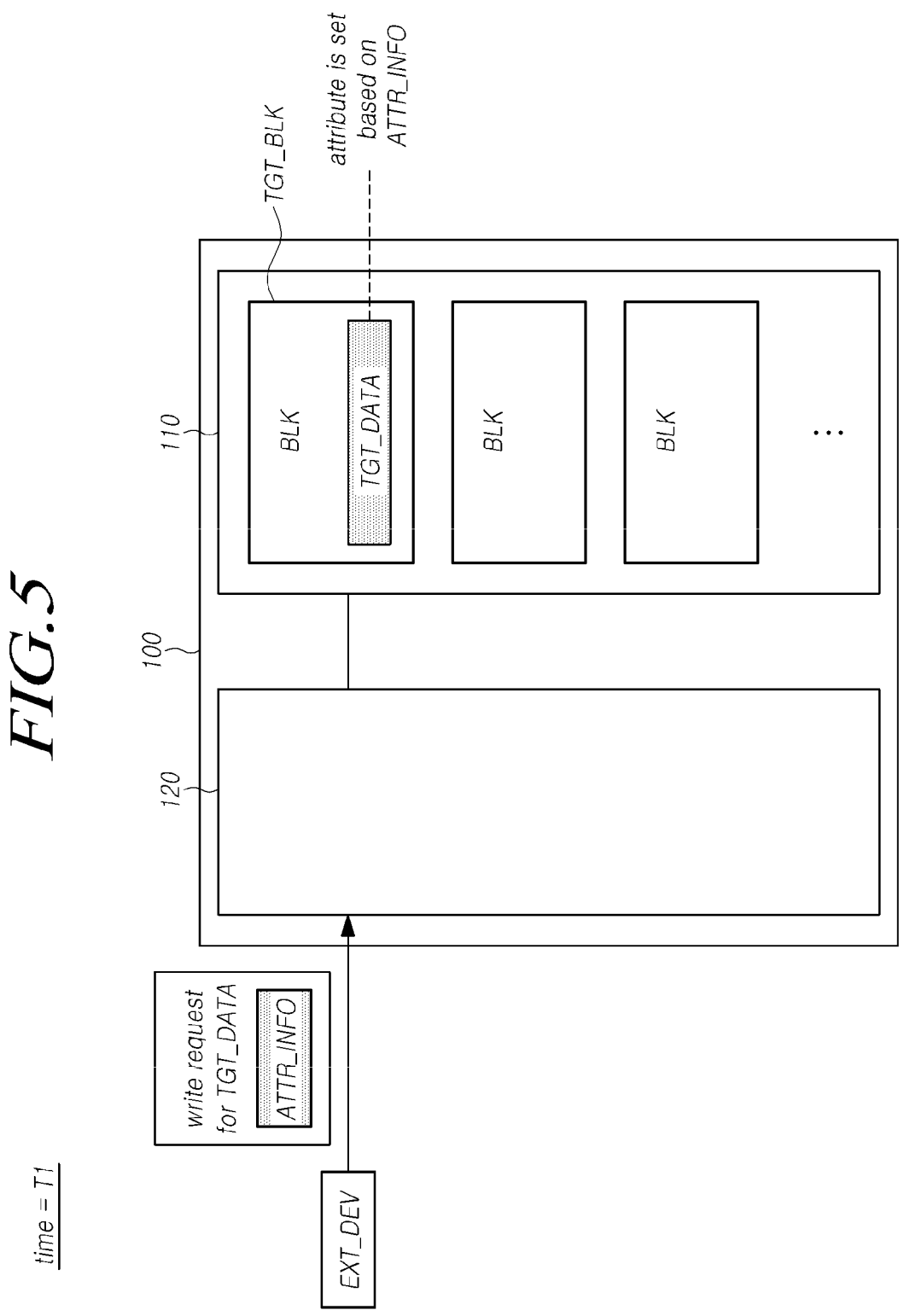
FIG. 5 illustrates an example of a storage device at a first time point according to embodiments of the present disclosure.

FIG. 5 illustrates an example of a storage device 100 at a first time point T1 according to embodiments of the present disclosure.

Referring to FIG. 5, the first time point T1 may be a time point when the controller 120 starts writing the data TGT_DATA to the target memory block TGT_BLK. That is, the time period TP described in FIG. 4 may start from the time point when the controller 120 writes the data TGT_DATA into the target memory block TGT_BLK.

During this time, the controller 120 of the storage device 100 may receive a write request for the data TGT_DATA from the external device EXT_DEV. The controller 120 may write the data TGT_DATA into the target memory block TGT_BLK according to the write request received from the external device EXT_DEV. At this time, the controller 120 may set a time point at which the data TGT_DATA starts to be written in the target memory block TGT_BLK as the first time point T1.

Meanwhile, when the controller 120 writes the data TGT_DATA in the target memory block TGT_BLK, the controller 120 may set the attribute of the data TGT_DATA based on attribute information ATTR_INFO received from the external device EXT_DEV. The attribute information ATTR_INFO may indicate the attribute of the data TGT_DATA determined by the external device EXT_DEV. At the first time point T1, because the controller 120 has yet to determine by itself the attribute of the data TGT_DATA, the controller 120 may use the attribute information ATTR_INFO received from the external device EXT_DEV.

Figure 6:
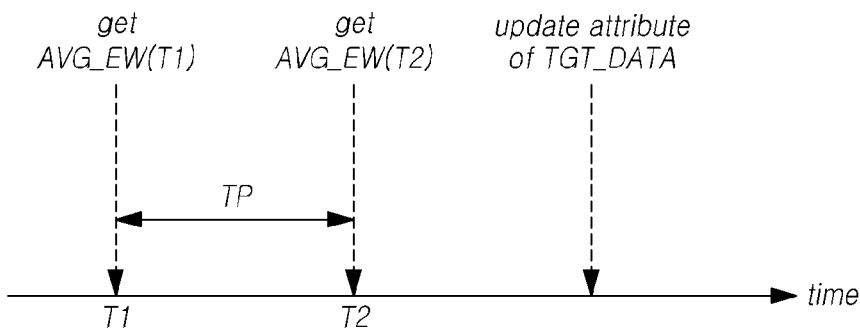
FIG. 6 illustrates an example of value used by a storage device to update an attribute of data according to embodiments of the present disclosure.

FIG. 6 illustrates an example of value used by a storage device 100 to update an attribute of data TGT_DATA according to embodiments of the present disclosure.

Referring to FIG. 6, the aforementioned reference value REF_VAL may be an average program-erase cycle AVG_EW of the memory 110. For example, the controller 120 may count the number of times that the plurality of memory blocks BLK included in the memory 110 are programmed after being erased, respectively, and calculate the average program-erase cycle AVG_EW of the memory 110 based on this. Accordingly, the average program-erase cycle AVG_EW may correspond to the average number of times each of the plurality of memory blocks BLK has been programmed after being erased.

For example, the controller 120 may determine an increment of the average program-erase cycle AVG_EW of the memory 110 based on the difference between the average program-erase cycle AVG_EW of the first time point T1 and the average program-erase cycle AVG_EW of the second time point T2. Accordingly, the increment of the average program-erase cycle AVG_EW may correspond to the average number of times each of the plurality of memory blocks BLK was been programmed after being erased during the time interval between the first time point T1 and the second time point T2.

In FIG. 6, the controller 120 of the storage device 100 may determine the average program-erase cycle AVG_EW (T1) at the first time point T1 and the average program-erase cycle AVG_EW(T2) at the second time point T2.

Further, the controller 120 may calculate the difference between the average program-erase cycle AVG_EW(T1) at the first time point T1 and the average program-erase cycle AVG_EW(T2) at the second time point T2, that is (AVG_EW(T2)-AVG_EW(T1)). This is an increment of the average program-erase cycle AVG_EW of the memory 110 during the time period TP.

In the embodiments of the present disclosure, the controller 120 may further consider, with the above-described increment of the average program-erase cycle AVG_EW, whether the data TGT_DATA is overwritten (②), and update the attribute of the data TGT_DATA.

In embodiments, the aforementioned reference value REF_VAL may be determined as a value other than the aforementioned average program-erase cycle AVG_EW.

For example, the reference value REF_VAL may be a timestamp value. Timestamp values of the first time point T1 and the second time point T2 may directly indicate when the first time point T1 and the second time point T2 are.

As another example, the reference value REF_VAL may be the sum of program-erase cycles of the plurality of memory blocks BLK.

Meanwhile, in the embodiments of the present disclosure, the controller 120 may determine whether to update the attribute of the data TGT_DATA when the data TGT_DATA is overwritten or becomes a target of garbage collection. Hereinafter, this will be described in detail.

Figure 7:
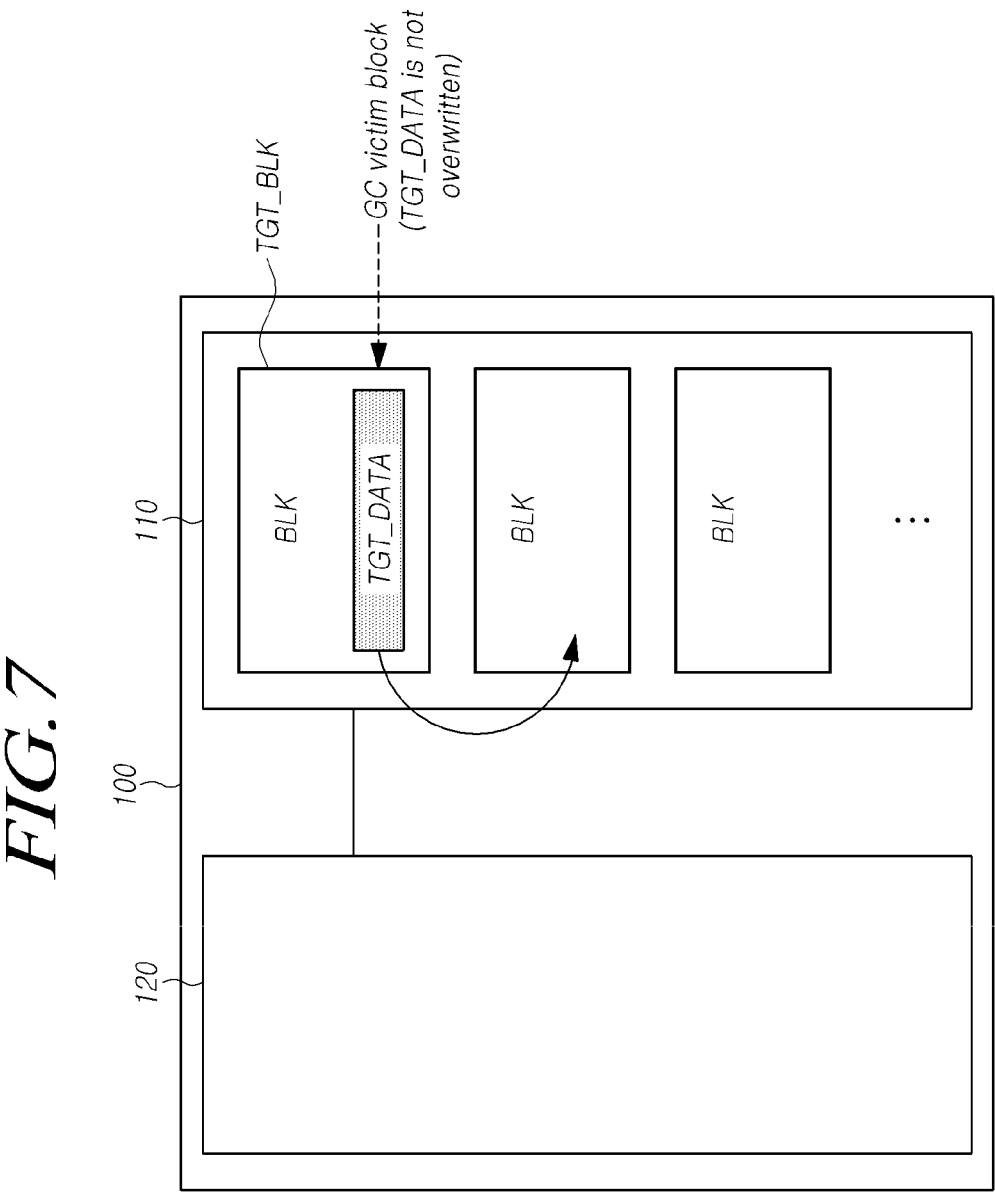
FIG. 7 illustrates an example of an operation in which a storage device determines whether data is overwritten according to embodiments of the present disclosure.

FIG. 7 illustrates an example of an operation in which a storage device 100 determines whether data is overwritten according to embodiments of the present disclosure.

Referring to FIG. 7, when the data TGT_DATA becomes the target of garbage collection GC, (that is, when the target memory block TGT_BLK is determined as a victim memory block for garbage collection GC), the controller 120 may determine that the data TGT_DATA is not overwritten. This is because the data TGT_DATA remains in the target memory block TGT_BLK without being overwritten until the target memory block TGT_BLK is determined as a victim memory block for garbage collection GC.

When the target memory block TGT_BLK is determined as a victim memory block for garbage collection GC, the data TGT_DATA may be migrated to another memory block.

In this case, the controller 120 may determine that the data TGT_DATA has not been overwritten at the time point when the target memory block TGT_BLK is determined as a victim memory block for garbage collection GC, and the attribute of the data TGT_DATA may be updated based on the determination. Hereinafter, this will be described in detail in FIGS. 8 and 9.

Figure 8:
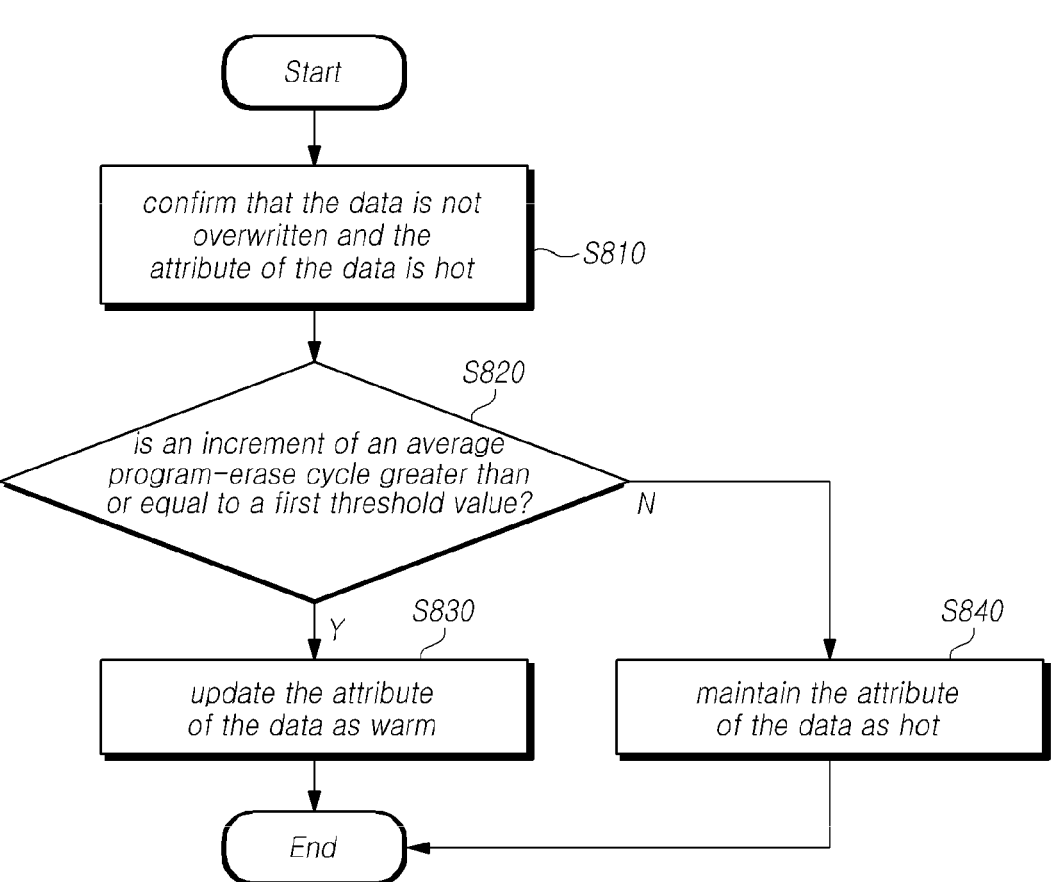
FIG. 8 is a flow chart illustrating an example of an operation in which a storage device updates an attribute of data when it is determined that the data is not overwritten according to embodiments of the present disclosure.

FIG. 8 illustrates a flow chart illustrating an example of an operation in which a storage device 100 updates attribute of data TGT_DATA when it is determined that the data TGT_DATA is not overwritten according to embodiments of the present disclosure.

Referring to FIG. 8, the controller 120 of the storage device 100 may confirm that the data TGT_DATA is not being overwritten and the attribute of the data TGT_DATA is hot (S810).

After that, the controller 120 may determine whether an increment of an average program-erase cycle during the above-described time period TP is greater than or equal to a first threshold value (e.g., 0.5) (S820).

When the increment of the average program-erase cycle is greater than or equal to the first threshold value (S820-Y), the controller 120 may update the attribute of the data TGT_DATA from hot to warm (S830). That is, the controller

120 may determine that the actual attribute of the data TGT_DATA is warm rather than hot when the increment of the average program-erase cycle is equal to or greater than the first threshold value.

On the other hand, when the increment of the average program-erase cycle is less than the first threshold value (S820-N), the controller 120 may maintain the attribute of the data TGT_DATA as hot (S840).

Figure 9:
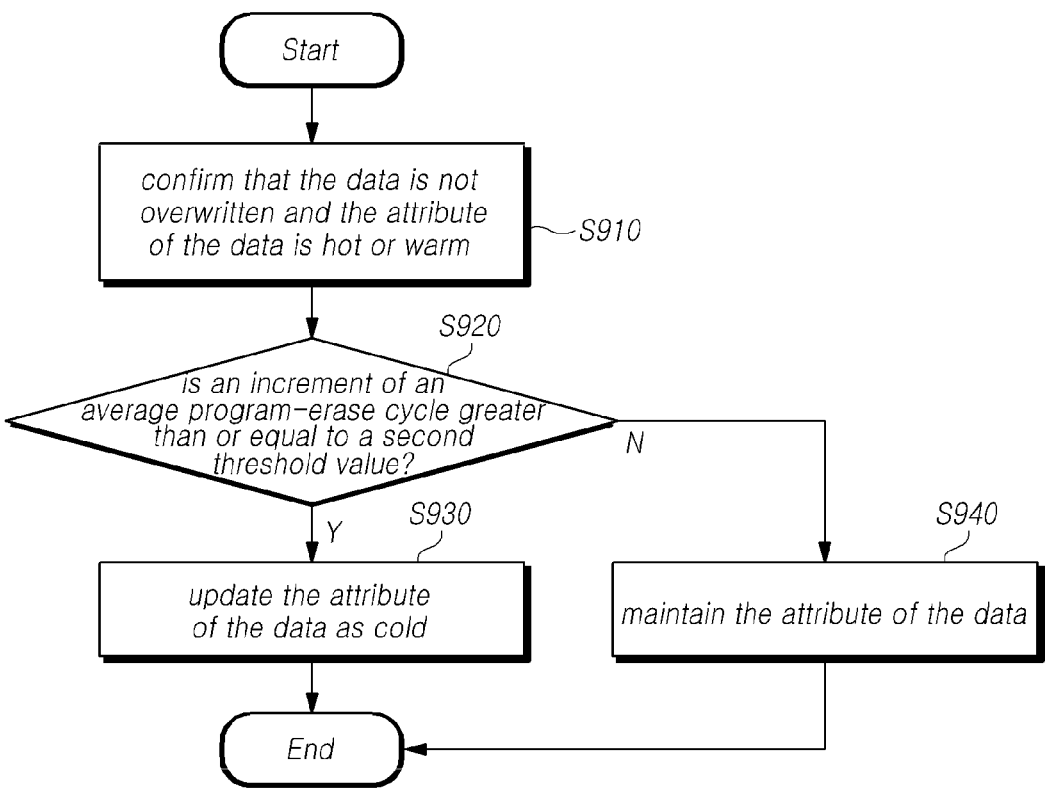
FIG. 9 is a flow chart illustrating another example of an operation in which a storage device updates an attribute of data when it is determined that the data is not overwritten according to embodiments of the present disclosure.

FIG. 9 illustrates a flow chart illustrating another example of an operation in which a storage device 100 updates attribute of data TGT_DATA when it is determined that the data TGT_DATA is not overwritten according to embodiments of the present disclosure.

Referring to FIG. 9, the controller 120 of the storage device 100 may confirm that the data TGT_DATA is not being overwritten and that the attribute of the data TGT_DATA is hot or warm (S910).

After that, the controller 120 may determine whether an increment of an average program-erase cycle during the above-described time period TP is greater than or equal to a second threshold value (e.g., 1) (S920). At this time, the second threshold value is greater than the first threshold value.

When the increment of the average program-erase cycle is greater than or equal to the second threshold value (S920-Y), the controller 120 may update the attribute of the data TGT_DATA from hot or warm to cold (S930). That is, the controller 120 may determine that the actual attribute of the data TGT_DATA is cold rather than hot or warm when the increment of the average program-erase cycle is equal to or greater than the second threshold value.

On the other hand, when the increment of the average program-erase cycle is less than the second threshold value (S920-N), the controller 120 may maintain the attribute of the data TGT_DATA (S940).

Figure 10:
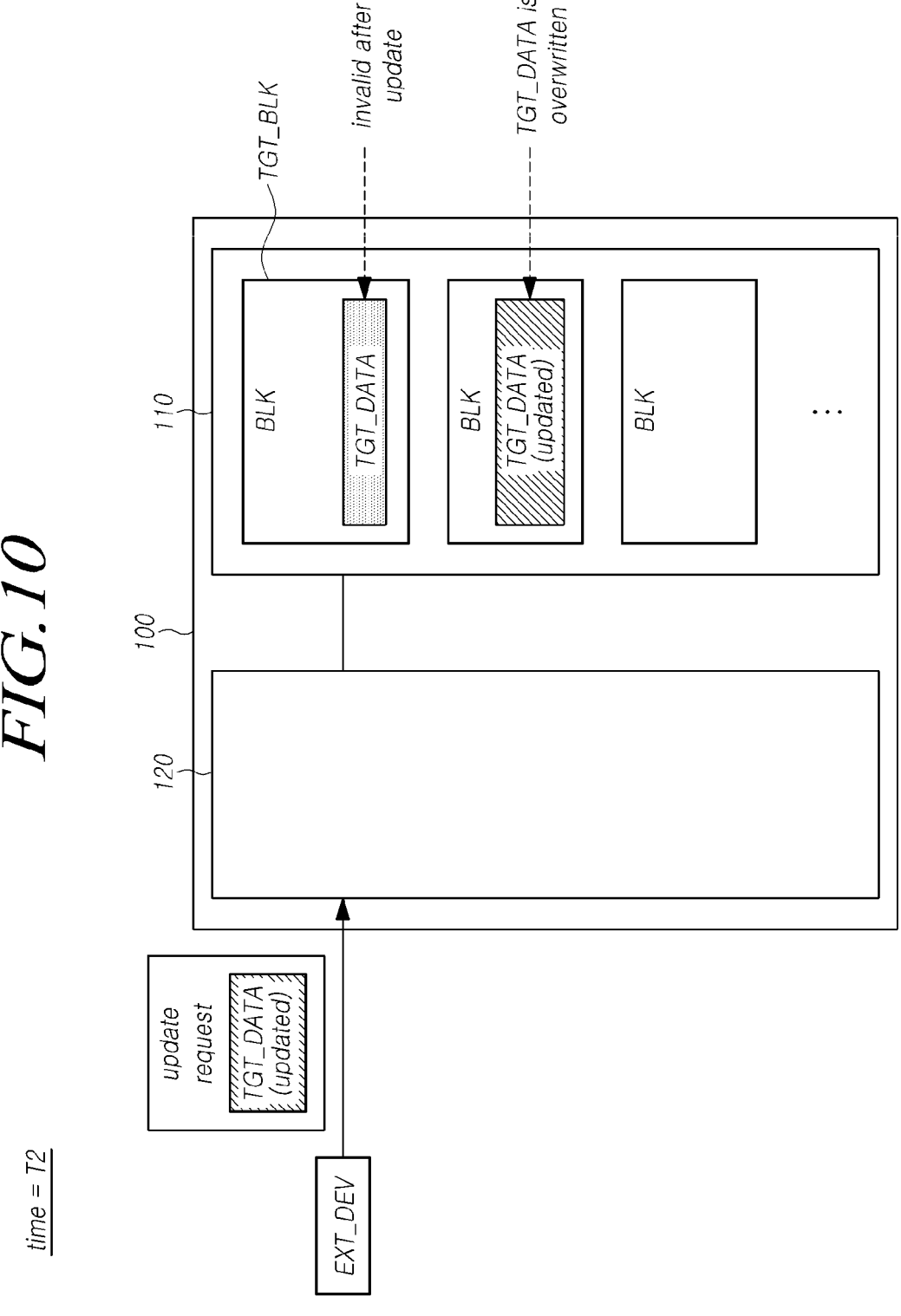
FIG. 10 illustrates another example of an operation in which a storage device determines whether data is overwritten according to embodiments of the present disclosure.

FIG. 10 illustrates another example of an operation in which a storage device 100 determines whether data TGT_DATA is overwritten according to embodiments of the present disclosure.

In FIG. 10, when receiving an update request for the data TGT_DATA from the external device EXT_DEV, the controller 120 may determine that the data TGT_DATA is being overwritten.

Because it is impossible to directly overwrite the data TGT_DATA in the target memory block TGT_BLK, the data TGT_DATA being updated may include moving the data TGT_DATA to another memory block. Also, the data TGT_DATA previously stored in the target memory block TGT_BLK is set as being invalid.

In this case, the controller 120 may determine that the data TGT_DATA is overwritten at the time point when the update request for the data TGT_DATA is received from the external device EXT_DEV, and the controller 120 may update the attribute of the data TGT_DATA based on the determination. Hereinafter, this will be described in detail in FIGS. 11 and 12.

Figure 11:
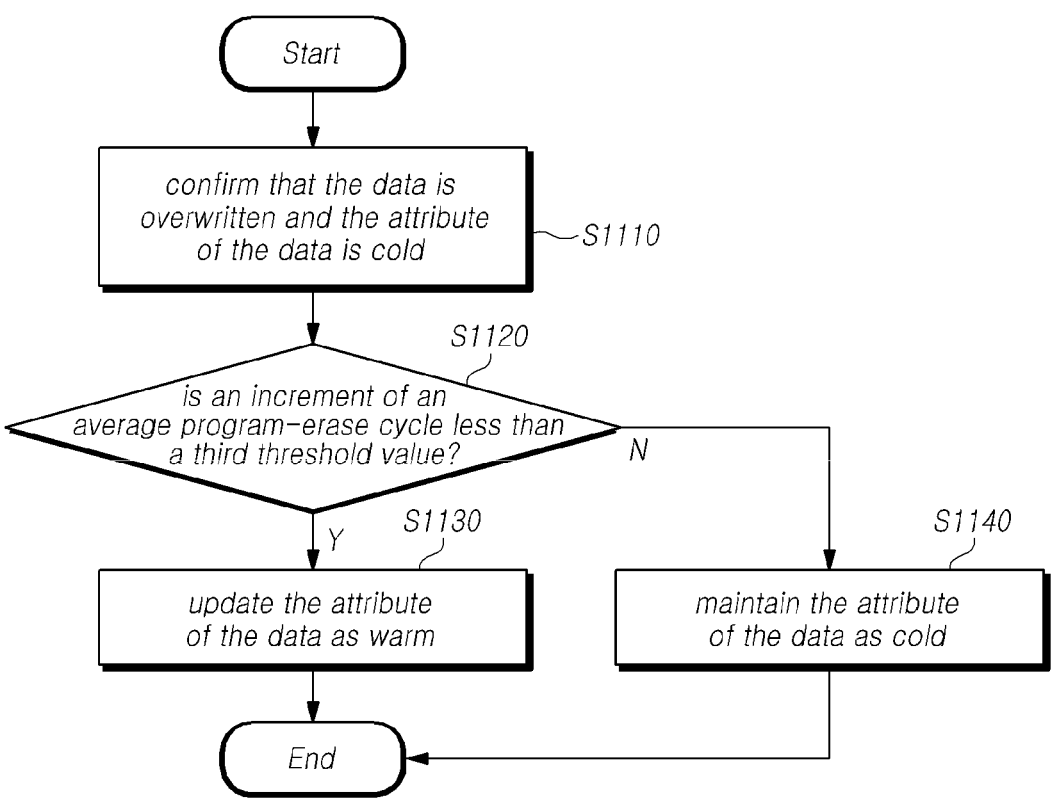
FIG. 11 is a flow chart illustrating an example of an operation in which a storage device updates an attribute of data when it is determined that the data is overwritten according to embodiments of the present disclosure.

FIG. 11 illustrates a flow chart illustrating an example of an operation in which a storage device 100 updates attribute of data TGT_DATA when it is determined that the data TGT_DATA is overwritten according to embodiments of the present disclosure.

Referring to FIG. 11, the controller 120 of the storage device 100 may confirm that the data TGT_DATA is being overwritten and the attribute of the data TGT_DATA is cold (S1110).

After that, the controller 120 may determine whether an increment of an average program-erase cycle is less than a third threshold value (e.g. 1) during the above-described time period TP (S1120).

When the increment of the average program-erase cycle is less than the third threshold value (S1120-Y), the controller 120 may update the attribute of the data TGT_DATA from cold to warm (S1130).

On the other hand, when the increment of the average program-erase cycle is equal to or greater than the third threshold value (S1120-N), the controller 120 may maintain the attribute of the data TGT_DATA as cold (S1140).

Figure 12:
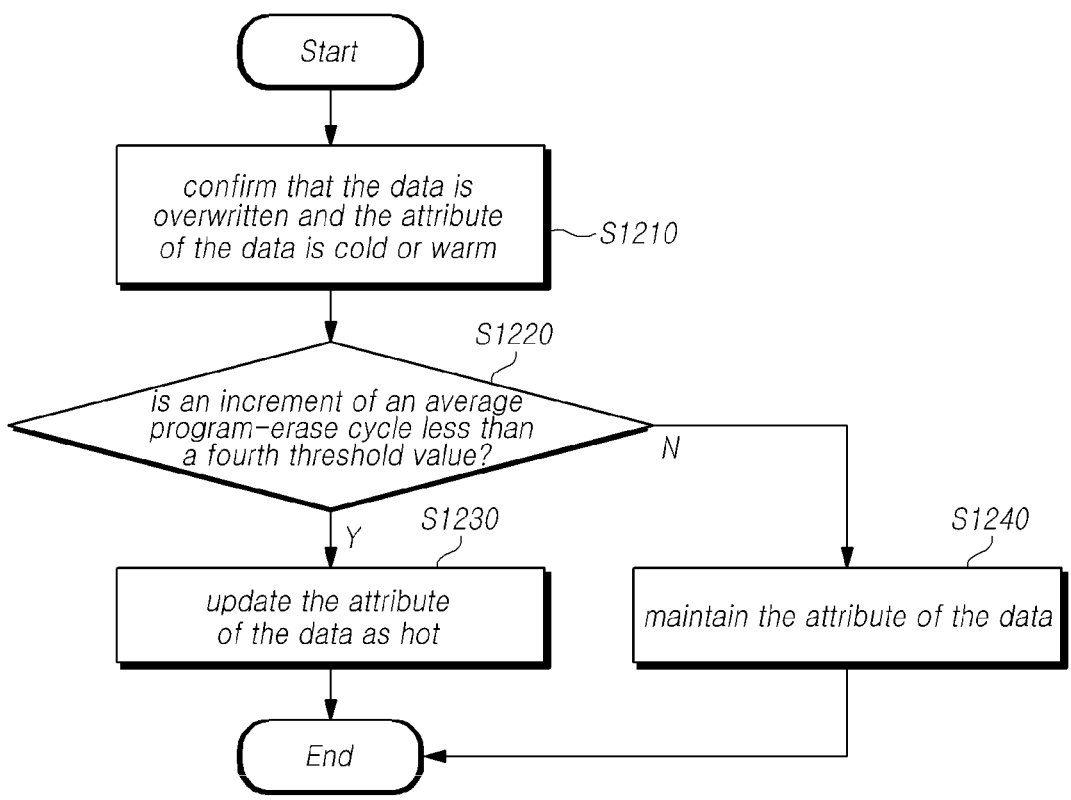
FIG. 12 is a flow chart illustrating another example of an operation in which a storage device updates an attribute of data when it is determined that the data is overwritten according to embodiments of the present disclosure.

FIG. 12 illustrates a flow chart illustrating another example of an operation in which a storage device 100 updates attribute of data TGT_DATA when it is determined that the data TGT_DATA is overwritten according to embodiments of the present disclosure.

Referring to FIG. 12, the controller 120 of the storage device 100 may confirm that the data TGT_DATA is overwritten and the attribute of the data TGT_DATA is cold or warm (S1210).

After that, the controller 120 may determine whether an increment of an average program-erase cycle is less than a fourth threshold value (e.g. 0.5) during the above-described time period TP (S1220). In this case, the fourth threshold value is less than the third threshold value.

When the increment of the average program-erase cycle is less than the fourth threshold value (S1220-Y), the controller 120 may update the attribute of the data TGT_DATA from cold or warm to hot (S1230).

On the other hand, when the increment of the average program-erase cycle is equal to or greater than the fourth threshold value (S1220-N), the controller 120 may maintain the attribute of the data TGT_DATA (S1240).

Figure 13:
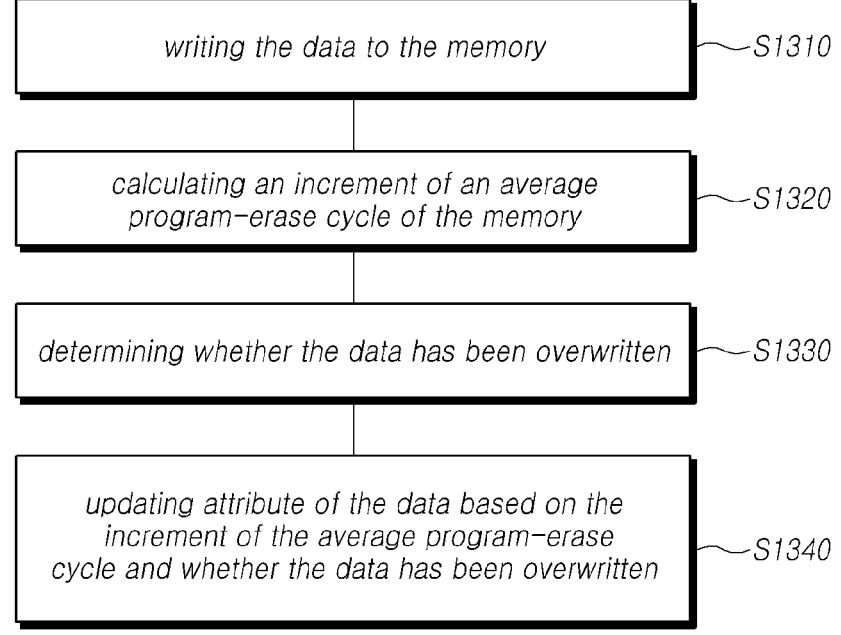
FIG. 13 illustrates an operating method of a storage device according to embodiments of the present disclosure.

FIG. 13 illustrates an operating method of a storage device 100 according to embodiments of the present disclosure.

Referring to FIG. 13, the operating method of the storage device 100 may include writing the data TGT_DATA requested by the external device EXT_DEV to the memory 110 (S1310).

The operating method of the storage device 100 may further include calculating an increment of an average program-erase cycle of the memory 110 (S1320).

For example, the increment of the average program-erase cycle may be calculated from the time point when the writing of the data TGT_DATA in the target memory block TGT_BLK is started.

The operating method of the storage device 100 may further include determining whether the data TGT_DATA has been overwritten (S1330). This step may be performed in response to the data TGT_DATA being overwritten and in response to the data TGT_DATA being the subject of garbage collection.

The operating method of the storage device 100 may include updating attribute of the data TGT_DATA based on the increment of the average program-erase cycle calculated in the operation S1320 and whether the data TGT_DATA has been overwritten determined in the operation S1330 (S1340).

For example, the operation S1340 may determine whether to update the attribute of the data TGT_DATA when the data TGT_DATA is overwritten or the data TGT_DATA is target of garbage collection.

For example, the operation S1340 may include updating the attribute of the data TGT_DATA to be warm when it is determined that the data TGT_DATA is not overwritten and the attribute of the data TGT_DATA is hot and the increment of the average program-erase cycle of the memory 110 is equal to or greater than a first threshold value.

The operation S1340 may further include updating the attribute of the data TGT_DATA to be cold when it is determined that the data TGT_DATA is not overwritten and the attribute of the data TGT_DATA is hot or warm and the increment of the average program-erase cycle of the memory 110 is equal to or greater than a second threshold value. In this case, the second threshold value is greater than the first threshold value.

As another example, the operation S1340 may include updating the attribute of the data TGT_DATA to be warm when it is determined that the data TGT_DATA is overwritten and the attribute of the data TGT_DATA is cold and the increment of the average program-erase cycle of the memory 110 is equal to or less than a third threshold value.

The operation S1340 may further include updating the attribute of the data TGT_DATA to be hot when it is determined that the data TGT_DATA is overwritten and the attribute of the data TGT_DATA is cold or warm and the increment of the average program-erase cycle of the memory 110 is equal to or less than a fourth threshold value. In this case, the fourth threshold value is less than the third threshold value.

For example, the attribute of the data TGT_DATA may be one of a plurality of candidate attributes. In this case, the plurality of candidate attributes may include hot, cold, and warm.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of blocks; and
a controller configured to:
write data to the memory in response to a request from an external device, and
update an attribute of the data based on an increment of an average program-erase cycle of the memory and whether the data has been overwritten,
wherein a first time point corresponds to a time of the write of the data to the memory;
wherein a second time point corresponds to a time of a determination of whether to perform the update of the attribute of the data;
wherein the controller is configured to determine average program-erase cycles of the memory for time periods according to an average of the number of times each of the plurality of blocks has been programmed after being erased during the time periods, respectively; and
wherein the controller is configured to determine the increment of the average program-erase cycle of the memory according to a first average program-erase cycle of the memory for a first time period corresponding to the first time point and a second average program-erase cycle of the memory for a second time period corresponding to the second time point.

2. The storage device according to claim 1, wherein the attribute of the data is configured to include a value corresponding to any one of a plurality of candidate attributes, wherein the plurality of candidate attributes include hot, cold, and warm, wherein the attribute of the data including hot indicates a data update frequency that is higher than or equal to a first threshold update frequency, wherein the attribute of the data including cold indicates that the data update frequency is lower than or equal to a second threshold update frequency, and wherein the attribute of the data including warm indicates that the data update frequency is between the first threshold update frequency and the second threshold update frequency.

3. The storage device according to claim 1, wherein the controller is configured to perform the determination of whether to update the attribute of the data when the data is overwritten, or when the data is a target of garbage collection.

4. The storage device according to claim 1, wherein the controller is configured to:
set the attribute of the data based on attribute information received from the external device.

5. The storage device according to claim 2, wherein the controller is configured to:
update the attribute of the data to be warm when it is determined that the data is not overwritten, the attribute of the data is hot, and the increment of the average program-erase cycle of the memory is equal to or greater than a first threshold value.

6. The storage device according to claim 5, wherein the controller is configured to:
update the attribute of the data to be cold when it is determined that the data is not overwritten, the attribute of the data is hot or warm, and the increment of the average program-erase cycle of the memory is equal to or greater than a second threshold value, wherein the second threshold value is greater than the first threshold value.

7. The storage device according to claim 2, wherein the controller is configured to:
update the attribute of the data to be warm when it is determined that the data is overwritten, the attribute of the data is cold, and the increment of the average program-erase cycle of the memory is equal to or less than a third threshold value.

8. The storage device according to claim 7, wherein the controller is configured to:
update the attribute of the data to be hot when it is determined that the data is overwritten, the attribute of the data is cold or warm, and the increment of the average program-erase cycle of the memory is equal to or less than a fourth threshold value, wherein the fourth threshold value is less than the third threshold value.

9. An operating method of a storage device, the operating method comprising:
writing data requested by an external device to a memory including a plurality of blocks;
calculating an increment of an average program-erase cycle of the memory;

determining whether the data has been overwritten; and
updating an attribute of the data based on the increment of the average program-erase cycle and whether the data has been overwritten,
wherein a first time point corresponds to a time of the write of the data to the memory;
wherein a second time point corresponds to a time of a determination of whether to perform the update of the attribute of the data;
wherein the average program-erase cycle of the memory for time periods is determined according to an average of the number of times each of the plurality of blocks has been programmed after being erased during the time periods, respectively; and
wherein the increment of the average program-erase cycle of the memory is determined according to a first average program-erase cycle of the memory for a first time period corresponding to the first time point and a second average program-erase cycle of the memory for a second time period corresponding to the second time point.

10. The operating method of claim 9, wherein the attribute of data is configured to include a value corresponding to any one of a plurality of candidate attributes, wherein the plurality of candidate attributes include hot, cold, and warm, wherein the attribute of the data including hot indicates a data update frequency that is higher than or equal to a first threshold update frequency, wherein the attribute of the data including cold indicates that the data update frequency is lower than or equal to a second threshold update frequency, and wherein the attribute of the data including warm indicates that the data update frequency is between the first threshold update frequency and the second threshold update frequency.

11. The operating method of claim 9, wherein updating the attribute of the data comprises:
determining whether to update the attribute of the data when the data is overwritten, or when the data is target of garbage collection.

12. The operating method of claim 10, wherein updating the attribute of the data comprises:
updating the attribute of the data to be warm when it is determined that the data is not overwritten, the attribute of the data is hot, and the increment of the average program-erase cycle of the memory is equal to or greater than a first threshold value.

13. The operating method of claim 12, wherein the updating the attribute of the data further comprises:
updating the attribute of the data to be cold when it is determined that the data is not overwritten, the attribute of the data is hot or warm, and the increment of the average program-erase cycle of the memory is equal to or greater than a second threshold value, wherein the second threshold value is greater than the first threshold value.

14. The operating method of claim 10, wherein the updating the attribute of the data comprises:
updating the attribute of the data to be warm when it is determined that the data is overwritten, the attribute of the data is cold, and the increment of the average program-erase cycle of the memory is equal to or less than a third threshold value.

15. The operating method of claim 14, wherein the updating the attribute of the data further comprises:

updating the attribute of the data to be hot when it is determined that the data is overwritten, the attribute of the data is cold or warm, and the increment of the average program-erase cycle of the memory is equal to or less than a fourth threshold value, wherein the fourth threshold value is less than the third threshold value.

16. A storage device comprising:

a memory including a plurality of memory blocks; and a controller configured to:

determine average program-erase cycle of the memory for time periods according to an average of the number of times each of the plurality of memory blocks has been programmed after being erased during the time periods, respectively;

determine an increment of an average program-erase cycle of the plurality of memory blocks according to a first average program-erase cycle of the memory for a first time period corresponding to a first time point and a second average program-erase cycle of the memory for a second time period corresponding to a second time point, the first time point corresponding to a time when data requested by an external device is written to a target memory block among the plurality of memory blocks, and the second time point corresponding to a reference time point, determine whether the data has been overwritten at the reference time point, and update an attribute of the data based on the increment of the average program-erase cycle and whether the data has been overwritten;

wherein the attribute of the data is hot, cold, or warm, wherein the reference time point is time point when the target memory block is determined as a victim memory block for garbage collection or when the data is over-written, wherein the attribute of the data including hot indicates a data update frequency that is higher than or equal to a first threshold update frequency, wherein the attribute of the data including cold indicates that the data update frequency is lower than or equal to a second threshold update frequency, and wherein the attribute of the data including warm indicates that the data update frequency is between the first threshold update frequency and the second threshold update frequency.

* * * * *